US012152767B2

(12) United States Patent
Scarlata et al.

(10) Patent No.: US 12,152,767 B2
(45) Date of Patent: Nov. 26, 2024

(54) THERMALLY CONDUCTIVE POLYMER LUMINAIRE

(71) Applicant: Eaton Intelligent Power Limited, Dublin (IE)

(72) Inventors: Andrew F. Scarlata, West Monroe, NY (US); Christopher Ring, Derry, NH (US); Shahab Zekriardehani, Farmington Hills, MI (US); Tim A. Kenyon, Syracuse, NY (US); Chinmaya Dandekar, Pune (IN); Joseph M. Manahan, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/930,458

(22) Filed: Sep. 8, 2022

(65) Prior Publication Data

US 2023/0003373 A1 Jan. 5, 2023

Related U.S. Application Data

(63) Continuation of application No. 17/145,067, filed on Jan. 8, 2021, now Pat. No. 11,473,768.

(60) Provisional application No. 62/959,609, filed on Jan. 10, 2020.

(51) Int. Cl.

| | |
|---|---|
| ***F21V 29/76*** | (2015.01) |
| ***F21V 7/00*** | (2006.01) |
| ***F21V 7/04*** | (2006.01) |
| ***F21V 15/01*** | (2006.01) |
| ***F21V 17/16*** | (2006.01) |
| ***F21V 29/87*** | (2015.01) |

(Continued)

(52) U.S. Cl.

CPC .......... *F21V 29/763* (2015.01); *F21V 7/0008* (2013.01); *F21V 7/041* (2013.01); *F21V 15/01* (2013.01); *F21V 17/164* (2013.01); *F21V 29/87* (2015.01); *F21Y 2103/10* (2016.08); *F21Y 2115/10* (2016.08)

(58) Field of Classification Search

CPC ...... F21V 29/763; F21V 7/0008; F21V 7/041; F21V 15/01; F21V 17/164; F21V 29/87; F21V 25/12; F21V 7/05; F21Y 2103/10; F21Y 2115/10

See application file for complete search history.

(56) References Cited

U.S. PATENT DOCUMENTS

| | | | |
|---|---|---|---|
| D280,346 | S | 8/1985 | Aspenwall |
| D459,517 | S | 6/2002 | Shemitz et al. |
| D561,930 | S | 2/2008 | Hukle et al. |

(Continued)

OTHER PUBLICATIONS

International Search Report and Written Opinion for PCT Application No. PCT/EP2021/025005, May 18, 2021, 17 pages, Rijswijk, Netherlands.

*Primary Examiner* — Tsion Tumebo
(74) *Attorney, Agent, or Firm* — Stinson LLP

(57) ABSTRACT

A polymer luminaire including a polymer housing having a longitudinal axis. An electrical board is mounted to an inner surface of the housing. The electrical board has an outer surface defining a plane extending at an angle to horizontal when the longitudinal axis of the housing is oriented parallel to horizontal. A light source is mounted to the electrical board and electrically connected to the electrical board for emitting light from the housing.

8 Claims, 14 Drawing Sheets

(51) Int. Cl.
*F21Y 103/10* (2016.01)
*F21Y 115/10* (2016.01)

(56) References Cited

U.S. PATENT DOCUMENTS

| | | | | |
|---|---|---|---|---|
| D584,844 | S | 1/2009 | Ghini | |
| 8,998,441 | B2 | 4/2015 | Kim | |
| D732,225 | S | 6/2015 | Grandsart et al. | |
| D733,952 | S | 7/2015 | Lay et al. | |
| D773,712 | S | 12/2016 | Cavaliere et al. | |
| D793,603 | S | 8/2017 | Parker et al. | |
| 9,791,142 | B2 | 10/2017 | Favarolo et al. | |
| 10,386,058 | B1 | 8/2019 | Cattoni et al. | |
| D875,987 | S | 2/2020 | Ling | |
| 10,841,996 | B2 | 11/2020 | Ellis et al. | |
| 10,948,160 | B2 | 3/2021 | He et al. | |
| D928,380 | S | 8/2021 | Bai et al. | |
| 11,719,419 | B1 | 8/2023 | Li et al. | |
| 2004/0125610 | A1 | 7/2004 | Lekson et al. | |
| 2008/0007945 | A1 | 1/2008 | Kelly et al. | |
| 2010/0027269 | A1 | 2/2010 | Lo et al. | |
| 2010/0254138 | A1 | 10/2010 | Chen et al. | |
| 2011/0103042 | A1* | 5/2011 | Tirrell | F21V 21/04 362/147 |
| 2011/0122618 | A1 | 5/2011 | Gantenbrink | |
| 2011/0188233 | A1 | 8/2011 | Josefowicz et al. | |
| 2011/0286214 | A1* | 11/2011 | Quinlan | F21V 19/003 362/235 |
| 2013/0088864 | A1 | 4/2013 | Verdes et al. | |
| 2013/0094207 | A1* | 4/2013 | Negandhi | F21K 9/232 362/235 |
| 2017/0101046 | A1 | 4/2017 | Beiwen | |
| 2017/0227207 | A1 | 8/2017 | Bendtsen et al. | |
| 2017/0307204 | A1 | 10/2017 | Cattoni | |
| 2018/0320840 | A1* | 11/2018 | Machlis | F21V 17/002 |
| 2021/0215332 | A1 | 7/2021 | Scarlata et al. | |

* cited by examiner

THERMALLY CONDUCTIVE POLYMER LUMINAIRE

CROSS-REFERENCE TO RELATED APPLICATION

This application is a continuation of U.S. application Ser. No. 17/145,067, filed Jan. 8, 2021, which claims priority to U.S. Provisional Patent Application Ser. No. 62/959,609, filed Jan. 10, 2020, which is hereby incorporated by reference in its entirety.

FIELD

The present disclosure relates to a luminaire and more particularly to a thermally conductive polymer luminaire.

BACKGROUND

Light fixtures are used in a variety of environments. In lighting applications, such as hazardous environments, reliability of the lighting system is vital. Unfortunately, the characteristics (e.g., humidity, extreme temperatures, corrosive gas) of many environments, including but not limited to hazardous environments, can cause the failure of one or more components of a light fixture to be accelerated. Further, the health and safety of a person located in such an environment can be at risk. When a light fixture is placed in certain environments, such as a hazardous environment, some of these components of a light fixture can pose a safety hazard and a violation of applicable standards if the components are not properly engineered and integrated with the rest of the light fixture.

A thermoplastic polymer must be able to withstand a variety of conditions, especially when utilized in outdoor products. Outdoor electrical products can be in service for 30 or more years and are consistently exposed to extremely harsh environments, such as temperatures ranging from −50° C. to 150° C., with constant exposure to ultraviolet radiation, rain, salt, fog, ozone, thermal cycling, corrosive chemicals, and the like.

SUMMARY

In one aspect, a thermally conductive polymer luminaire generally comprises a polymer housing including at least one thermally conductive filler to configure the polymer housing as a thermally conductive polymer housing. The housing includes an inner surface, an outer surface, and a thickness extending between the inner surface and outer surface. The thickness varies along a length of the housing. An electrical component is mounted to the inner surface of the housing opposite a location of the housing having a reduced thickness to facilitate thermal energy release from the housing. A light source is mounted to the housing and electrically connected to the electrical component for emitting light from the housing.

In another aspect, a thermally conductive polymer luminaire generally comprises a polymer housing including at least one thermally conductive filler to configure the polymer housing as a thermally conductive polymer housing. The housing has a longitudinal axis. An electrical board is mounted to an inner surface of the housing. The electrical board has an outer surface defining a plane extending at an angle to horizontal when the longitudinal axis of the housing is oriented parallel to horizontal. A light source is mounted to the electrical board and electrically connected to the electrical board for emitting light from the housing.

In yet another aspect, a thermally conductive polymer luminaire generally comprises a polymer housing including at least one thermally conductive filler to configure the polymer housing as a thermally conductive polymer housing. The housing has a length of less than about 40 inches (101.6 cm), a width of less than about 10 inches (25.4 cm), and a height of less than about 5 inches (12.7 cm). A plurality of electrical components are disposed in the housing whereby an ambient temperature rating of the luminaire is at least about 55° C.

DETAILED DESCRIPTION

Figure 1:
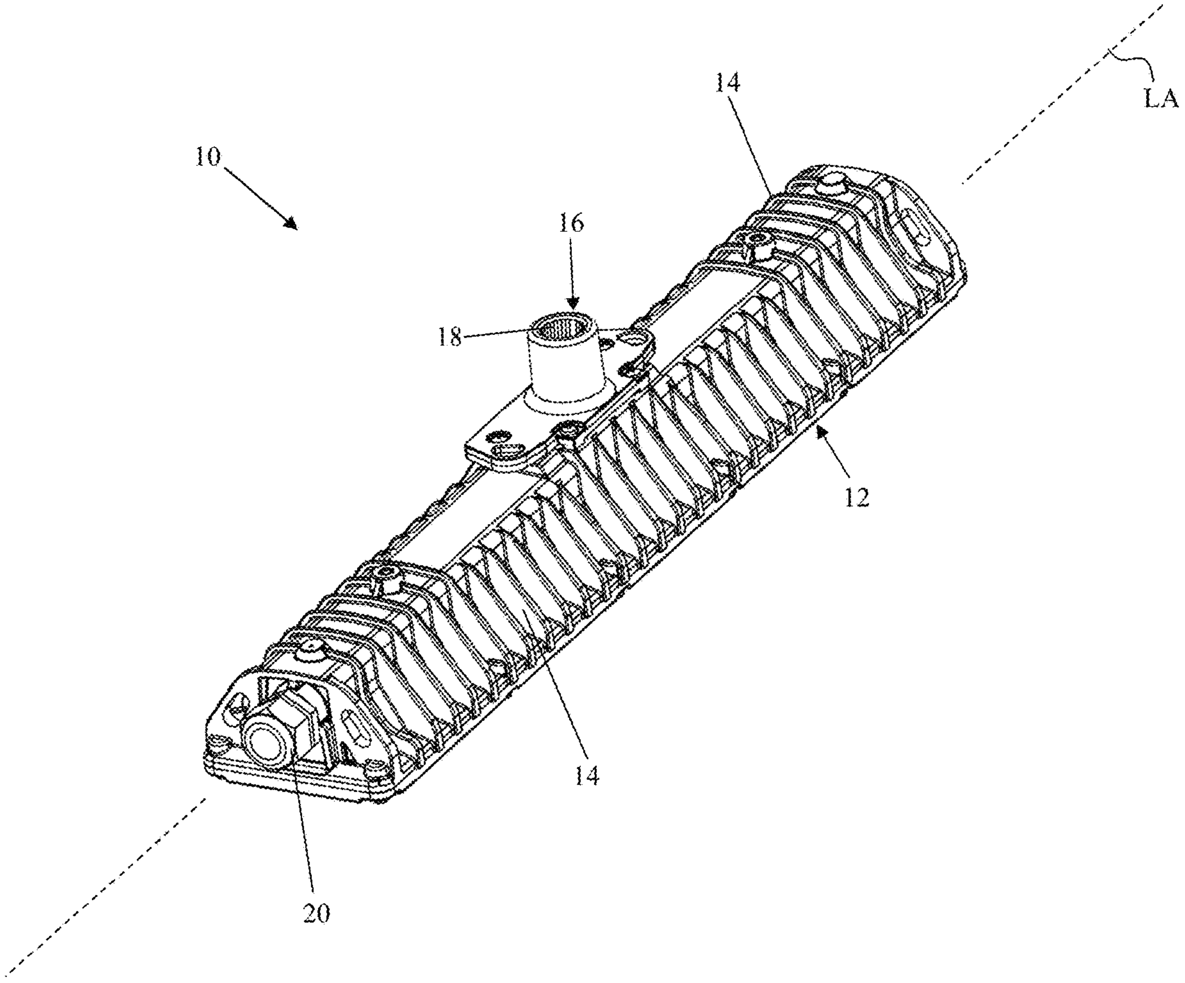
FIG. 1 is a top perspective of a luminaire.
Figure 2:
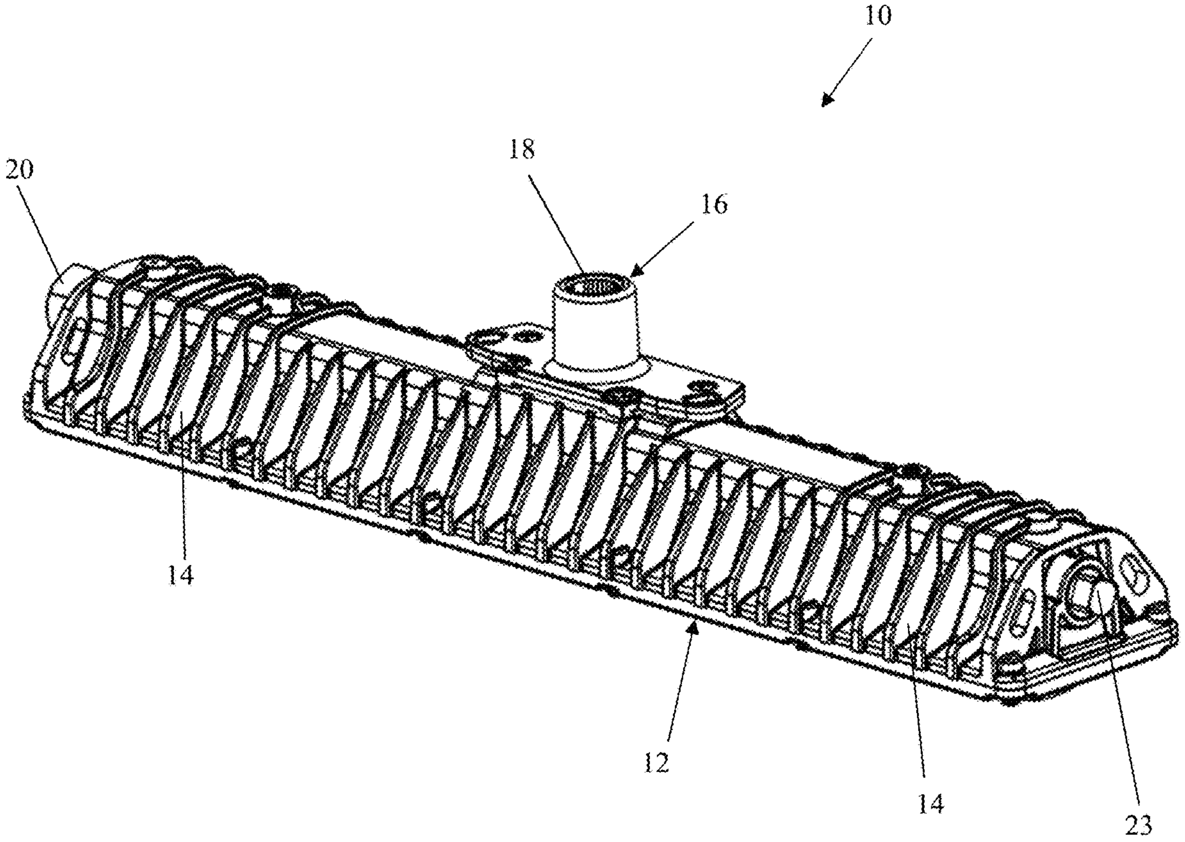
FIG. 2 is another top perspective of the luminaire.
Figure 3:
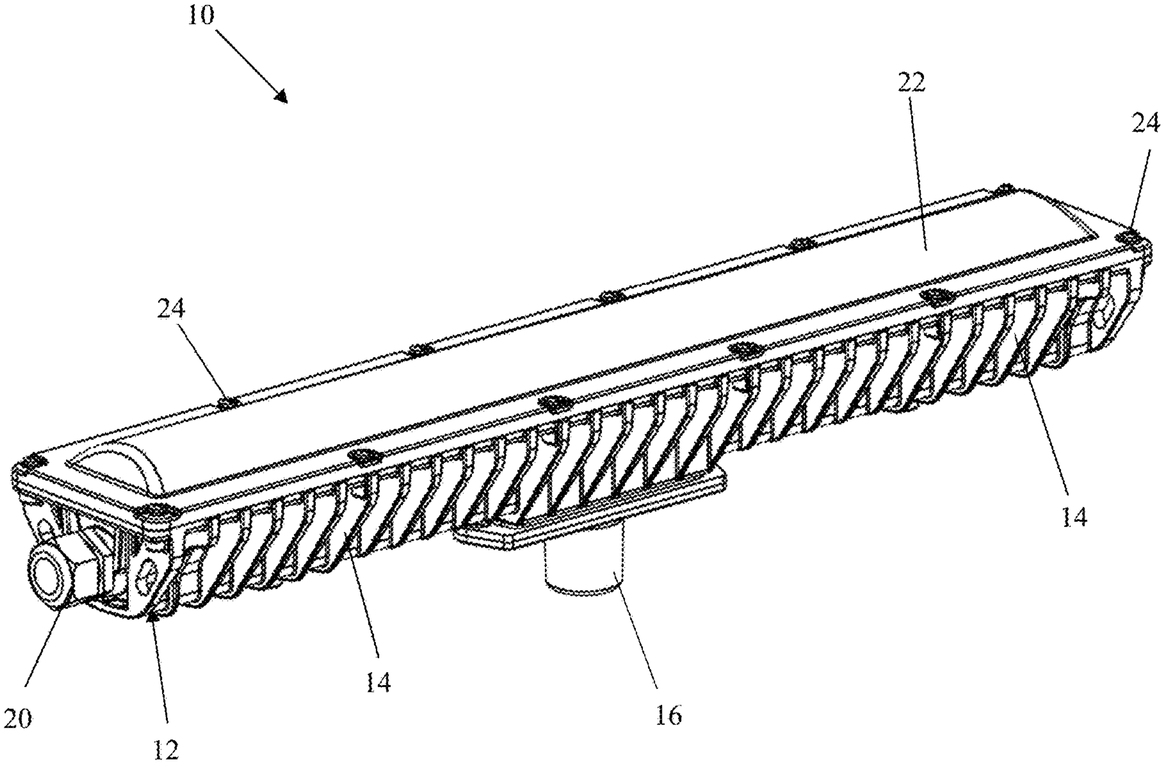
FIG. 3 is a bottom perspective of the luminaire.
Figure 7:
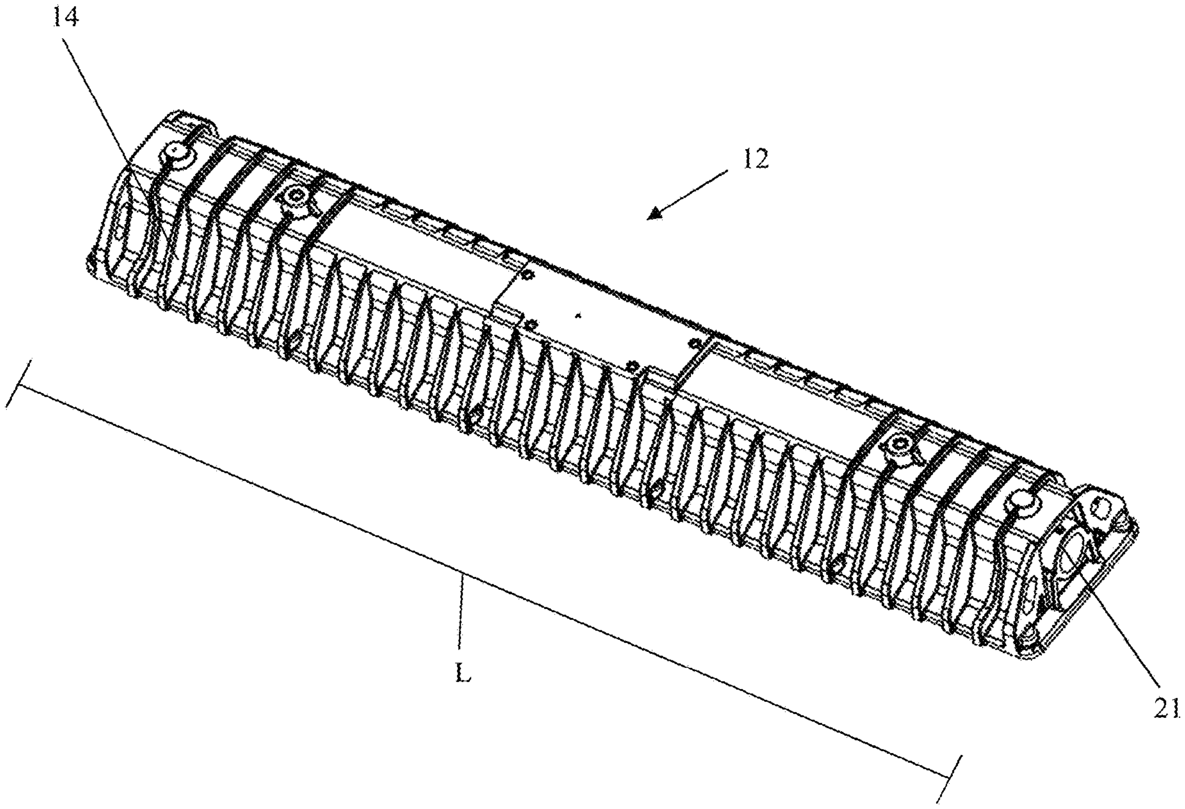
FIG. 7 is a top perspective of a housing of the luminaire.
Figure 8:
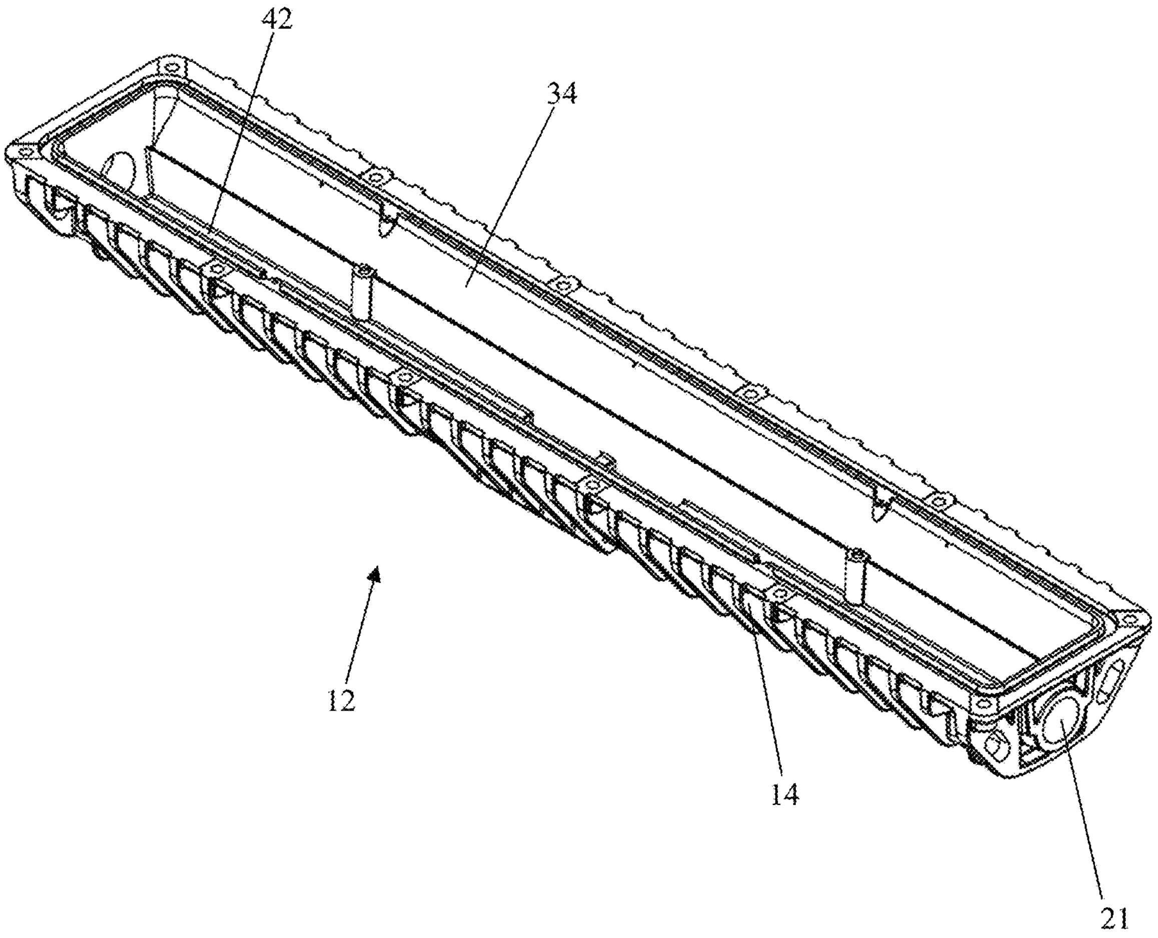
FIG. 8 is a bottom perspective of the housing.
Figure 9:
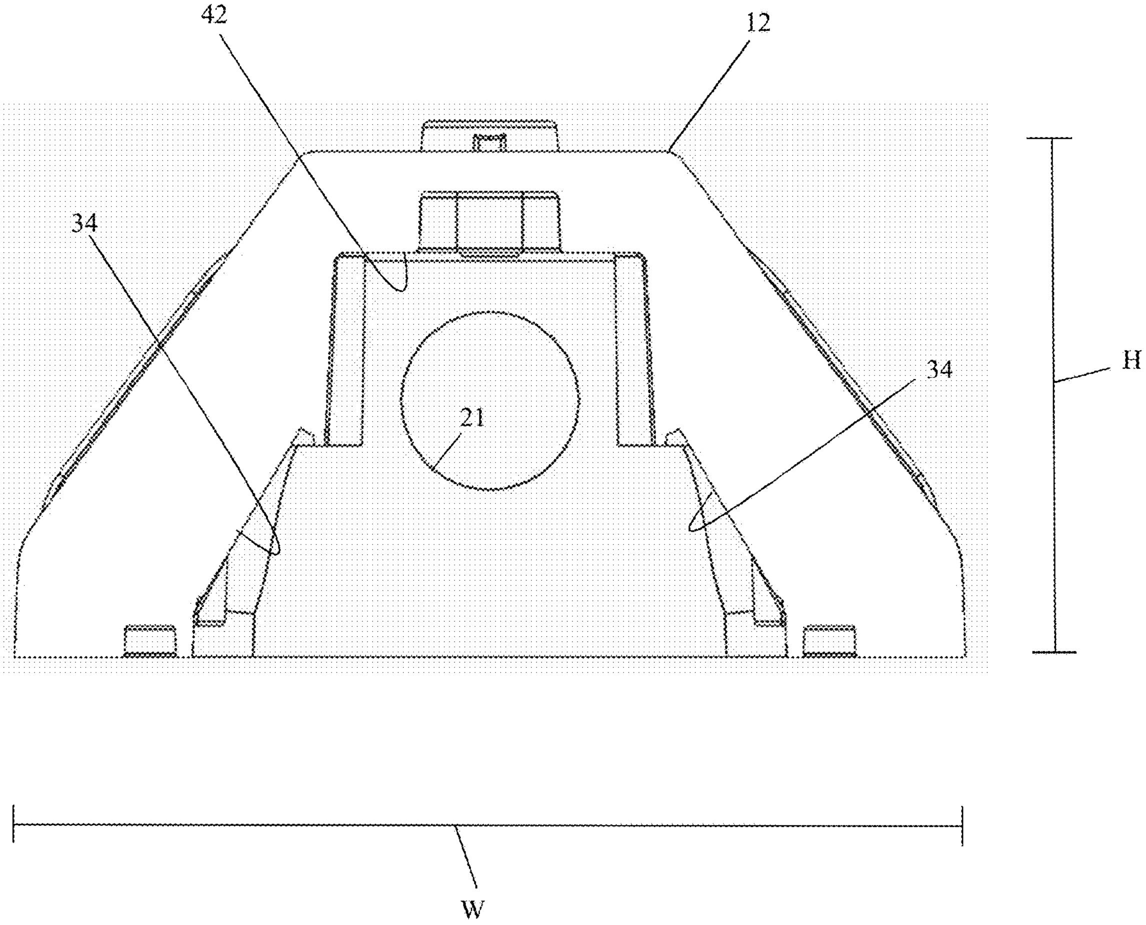
FIG. 9 is a section of the housing.
Figure 10:
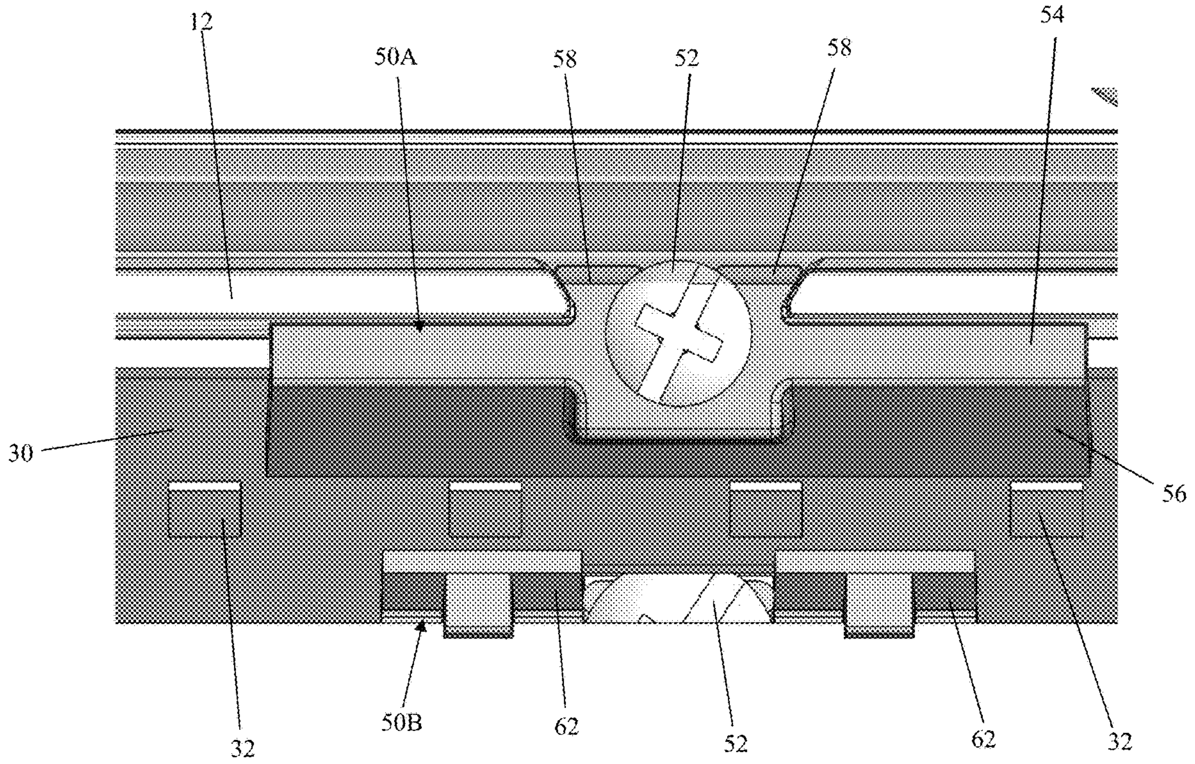
FIG. 10 is an enlarged fragmentary view of the luminaire
Figure 11:
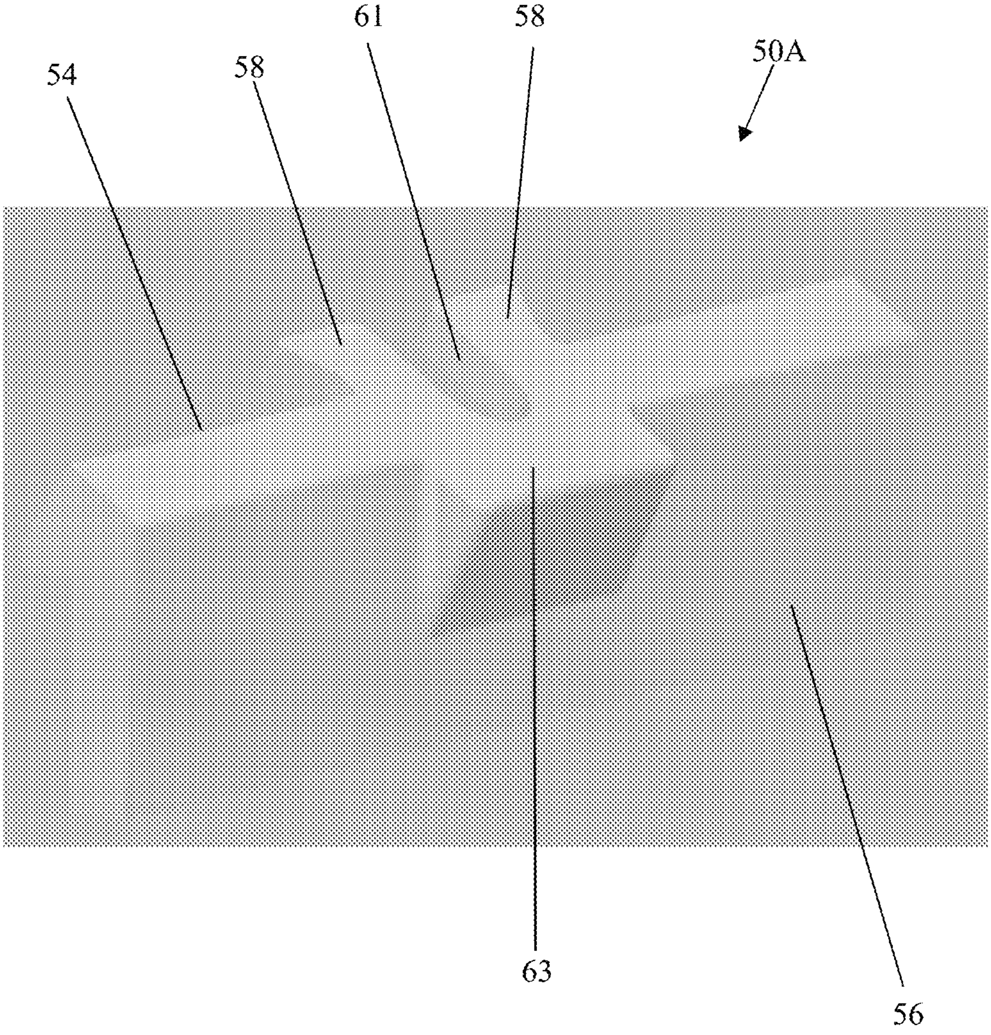
FIG. 11 is a perspective of a clip of the luminaire.
Figure 12:
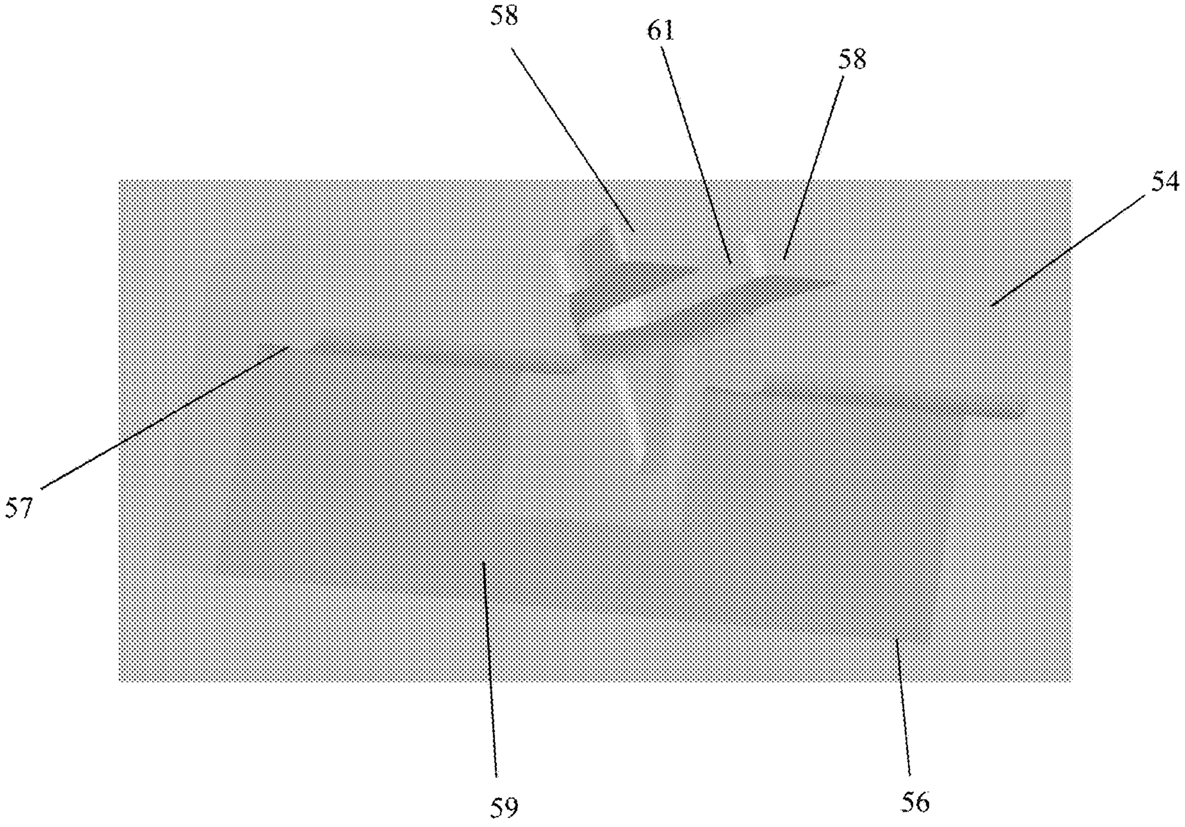
FIG. 12 is another perspective of the clip in FIG. 11.
Figure 13:
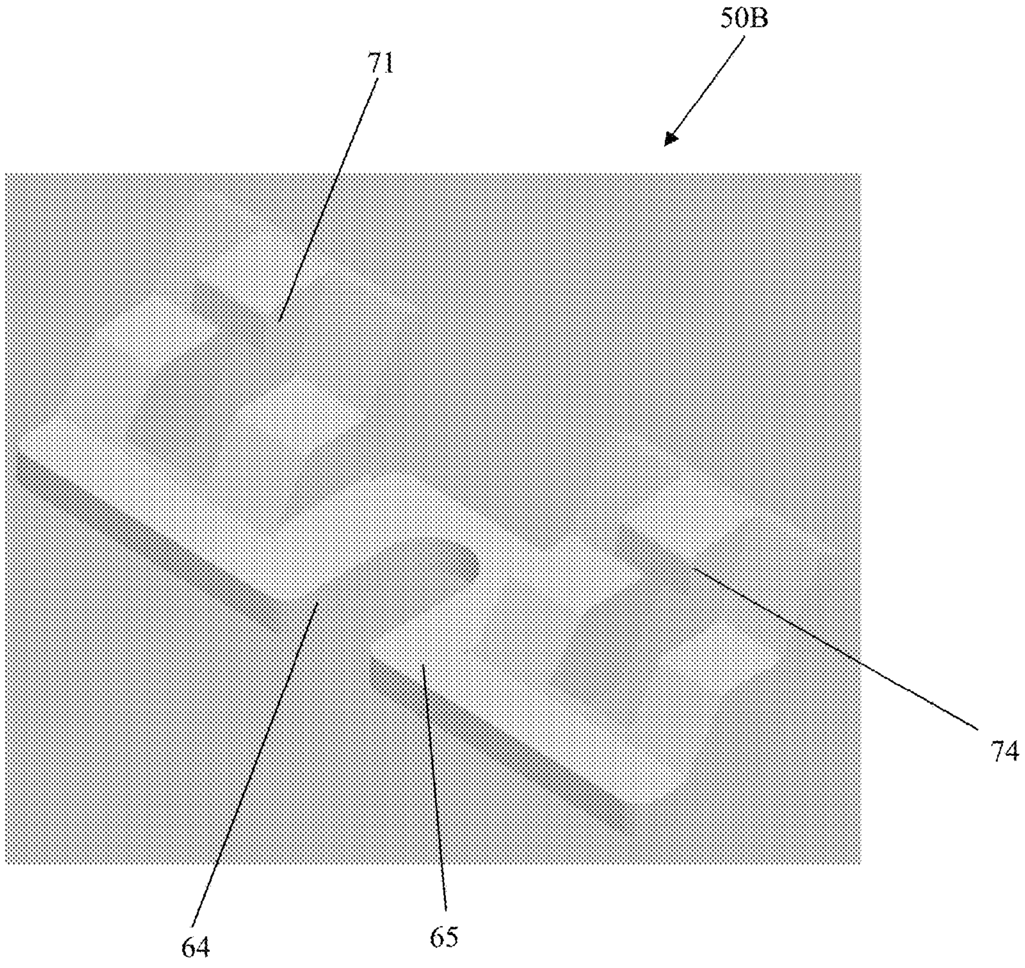
FIG. 13 is a perspective of another clip of the luminaire.
Figure 14:
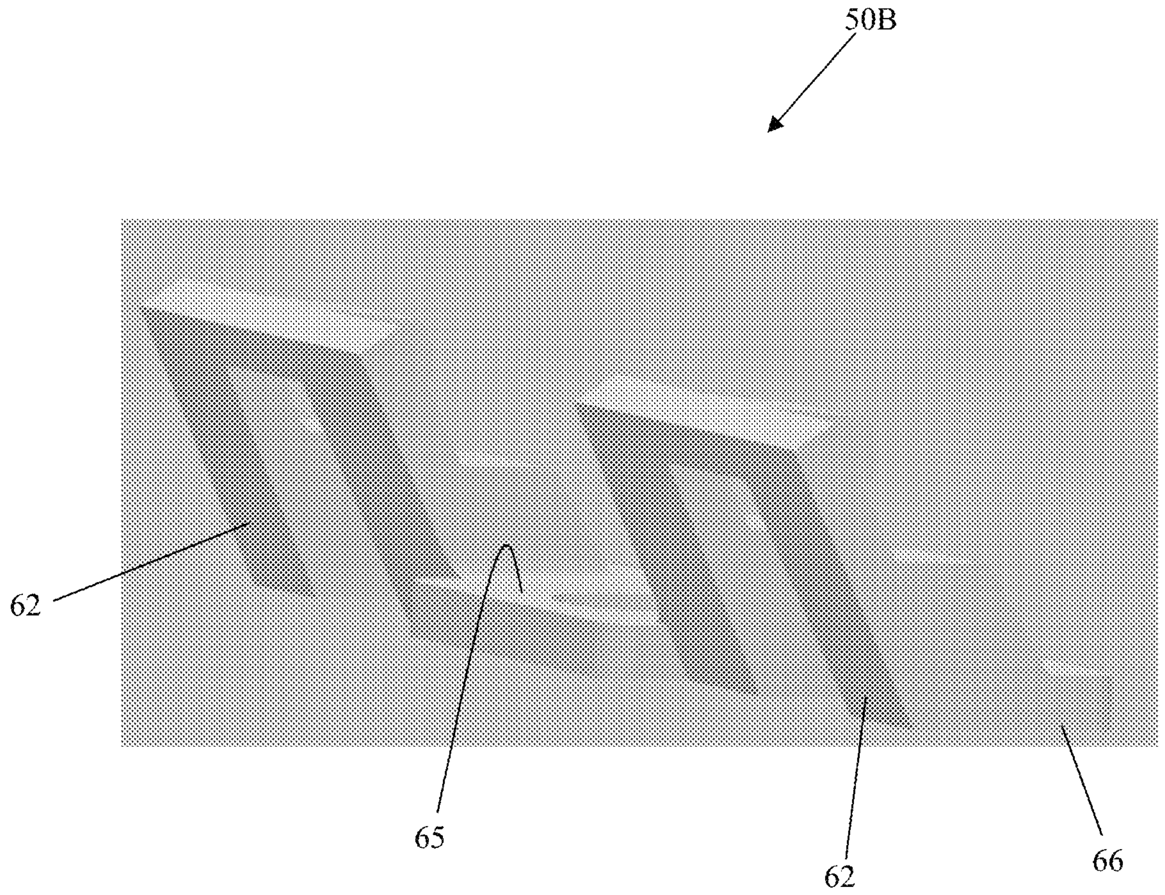
FIG. 14 is another perspective of the clip in FIG. 13.

Referring to FIGS. 1-3, the present disclosure is directed to a thermally conductive polymer luminaire 10. The luminaire has a compact design and is configured for use in hazardous locations. The luminaire 10 improves chemical resistance over traditional aluminum luminaires, while maintaining the ability to dissipate heat and endure impacts. Thus, the luminaire 10 is more lightweight, recyclable, a lower cost, and has a faster cycle time than traditional aluminum luminaires. Further, the luminaire 10 has a construction that maximizes thermal energy release to reduce a temperature within the luminaire. In particular, a housing 12 of the luminaire 10 is formed from a thermally conductive polymer and defines a plurality of heat dissipating fins 14 spaced along a length L (FIG. 7) of the housing. Thus, the fins 14 are integrally formed with and define a portion of the housing 12. In the illustrated embodiment, the fins 14 extend along substantially the entire length L of the housing 12. However, the fins 14 could have other arrangements without departing from the scope of the disclosure. Further, as will be explained in greater detail below, mounting locations of the heat generating components (e.g., electronics) in the housing 12 are selected to maximize the transfer of heat away from the luminaire 10.

A mounting fixture 16 is disposed on a top of the housing 12 for mounting the luminaire 10 in an installation position. For example, for mounting the luminaire 10 such that a longitudinal axis LA of the housing 12 is oriented generally horizontally. Still other installation positions are envisioned. The mounting fixture 16 includes threads 18 for mating with threaded mounting hardware to hang the fixture 10 from a pole or wall or the like. In the illustrated embodiment, the mounting fixture 16 is a pendant mount. However, other mounting fixtures are envisioned without departing from the scope of the disclosure.

A cable feed-through fixture 20 extends longitudinally from the housing 12 and is configured to run electrical power lines into an interior of the housing though an opening 21 in the housing in an explosion-proof manner. A plug 23 closes an opening on an opposite end of the housing 12. Alternatively, cable feed-through fixtures 20 may extend from both longitudinal ends of the housing 12 to run electrical power lines into the housing at one end and out of the housing at the other end. For example, electrical power lines can be run between two adjacent luminaires using the cable feed-through fixtures at their longitudinal ends. Electrical power lines may be run into the housing 12 in other ways without departing from the scope of the disclosure.

Figure 6:
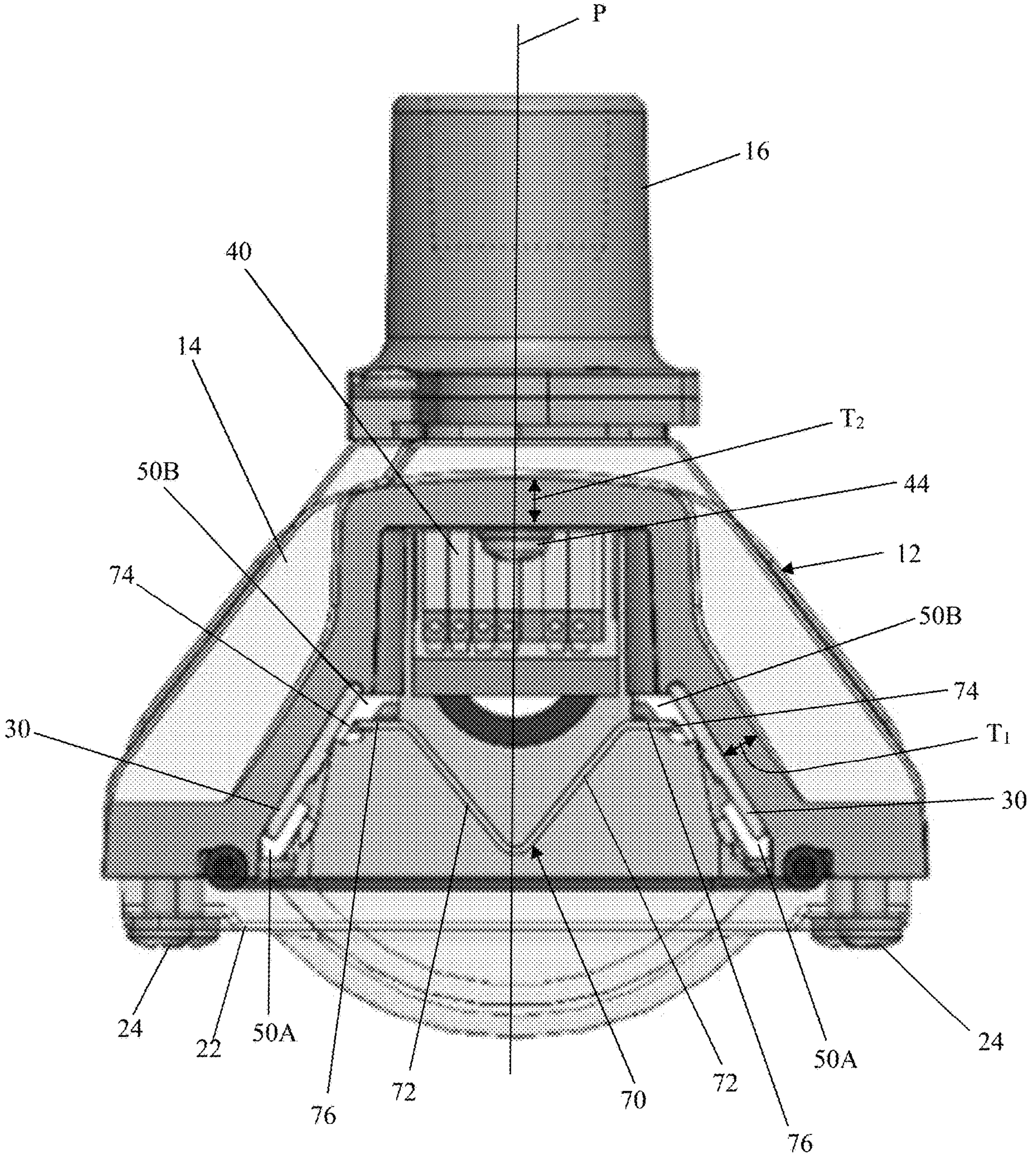
FIG. 6 is a section of the luminaire.

Referring to FIGS. 2, 3, and 6, a cover plate or window 22 is mounted to a bottom of the housing 12. Fasteners 24 secure the cover plate 22 to the housing 12. Thus, the cover plate 22 is removeably attached to the housing 12. The cover plate 22 may have any suitable construction. For example, the cover plate 22 may be flat or round or a combination of both. Additionally, at least a portion of the cover plate 22 may be transparent to permit light to pass. The cover plate 22 may also be formed from any suitable material. In one embodiment, the cover plate 22 is formed from a polycarbonate.

In one embodiment, the housing 12 comprises a conductive network made by incorporating different types of fillers into a polymer matrix in order to increase the thermal conductivity as well as the mechanical performance of the composite material. In this way, the mechanical performance of the polymer can be maintained without experiencing mechanical degradation as typically occurs when thermally conductive fillers are introduced. Different combinations of filler types can form the conductive network. In order to further improve the thermal conductivity and mechanical performance, nano-fillers can be used to enable formation of conductive networks at lower loadings. Nano-fillers can be provided in different shapes (e.g., spherical, platelet, and rod shape). Thus, the present disclosure generally uses certain nano-fillers, macro-fillers, and fibers in conjunction with a polymer or polymer blend (i.e., polymer matrix) to allow the thermally conductive material to survive in a variety of environments, including harsh and hazardous environments and outdoor, while reducing cost and maintaining desirable mechanical properties. In one embodiment, the housing 12 is formed by injection molding.

In one aspect, the present disclosure is directed to a thermally conductive polymer generally comprising a polymer matrix comprising a polymer or polymer blend, one or more fillers to improve thermal conductivity (thermally conductive filler), one or more fillers to improve tensile strength (tensile strength filler), and one or more fillers to improve impact strength (impact strength filler). Additional fillers can also be incorporated, such as electrically conductive fillers.

In one embodiment, the thermally conductive polymer of the present disclosure has a thermal conductivity of at least about 0.5 W/m*K for example from about 0.5 W/m*K to about 20 W/m*K. For example, in-plane thermal conductivity can be from about 0.5 W/m*K to about 20 W/m*K and through-plane thermal conductivity can be from about 0.5 W/m*K to about 3 W/m*K. Further, the thermally conductive polymer has an impact strength of at least about 7 $kJ/m^2$ for example from about 5 $kJ/m^2$ to about 30 $kJ/m^2$. The thermally conductive polymer also has a tensile strength of at least about 40 MPa, for example from about 40 MPa to about 90 MPa. In various embodiments, the thermally conductive polymer has a volume resistivity of at most about 10 Ω*cm for example from about 1 Ω*cm to about 10 Ω*cm.

The polymer matrix has a high resistance to chemicals and is able to withstand harsh and hazardous environments. In order to achieve ideal properties, a polymer blend may be preferred. Polymer choice can affect a variety of factors of the resulting thermoplastic, such as tensile strength, impact strength, chemical resistance, operating temperature, heat distortion temperature, and the like. Thus, blending different polymers with different desirable characteristics can provide a polymer matrix with a combination of those characteristics.

The polymer matrix can comprise a resin material. The polymer/resin can comprise a thermoplastic material or a thermoset material. In particular, useful polymers include thermoplastic polymers, for example, acrylonitrile butadiene styrene, acrylic, celluloid, cellulose acetate, cyclic olefin copolymer, ethylene-vinyl acetate, ethylene vinyl alcohol, polytetrafluoro ethylene, ionomers, liquid crystal polymer, polyoxymethylene, polyacrylates, polyacrylonitrile, polyamide (e.g., polyamide 66 or polyamide 6), polyamide-imide, polyimide, polyaryletherketone, polybutadiene, polybutylene terephthalate, polycarpolactone, polychlorotrifluoroetyhlene, polyether ether ketone, polyethylene terephthalate, poly-cylcohexylene dimethylene terephthalate, polycarbonate, polyhydroxalkanoates, polyketones, polyester, polyolefin (e.g., polyethylene, polypropylene, polybutylene, and the like) polyetherketoneketone, polyetherimide, polyethersulfone, polysulfone, chlorinated polyethylene, polylactic acid, polymethylmetacrylate, polymethylpentene, polyphenylene, polyphenylene sulfide (PPS), polyphthalamide, polystyrene, polysulfone, polytrimethylene terephthalate, polyurethane, polyvinyl acetate, polyvinyl chloride, polyvinylidene chloride, styrene-acrylonitrile, or mixtures thereof.

In various embodiments, the base polymer comprises polyphenylene sulfide (PPS) blended with one or more additional polymers. Because PPS is known to create, in some circumstances, a brittle composite, a second polymer can be blended with PPS in order to improve impact properties. For example, PPS can be blended with an elastomer or a polyolefin (such as, for example, polyethylene and/or polypropylene) at relatively low concentrations. Alternatively, in other embodiments, the base polymer comprises a polyketone blended with one or more additional polymers.

The thermally conductive filler can comprise any filler with thermal conductivity known in the art. The filler can have high thermal conductivity (for example, having a thermal conductivity of up to about 900 W/m*K or greater than about 10 W/m*K), an intermediate thermal conductivity (for example, having a thermal conductivity of from about 5 W/m*K to about 10 W/m*K), or a low thermal conductivity (less than about 5 W/m*K). Generally, high thermal conductivity and intermediate thermal conductivity fillers are preferred when used primarily as the thermally conductive filler. When used as the sole thermally conductive filler, high thermal conductivity fillers are most preferred, although intermediate thermal conductivity fillers could also be utilized.

As an example, the thermally conductive filler can comprise carbon black, alumina, boron nitride, silica, carbon fiber, graphene, graphene oxide, graphite (such as, for example, expanded graphite, synthesized graphite, low-temperature expanded graphite, and the like), aluminum nitride, silicon nitride, metal oxide (such as, for example, zinc oxide, magnesium oxide, beryllium oxide, titanium oxide, zirconium oxide, yttrium oxide, and the like), carbon nanotubes, calcium carbonate, talc, mica, wollastonite, clays (including exfoliated clays), metal powders (such as, for example, aluminum, copper, bronze, brass, and the like), or mixtures thereof. For example, the thermally conductive filler can comprise boron nitride, carbon fiber, graphite, carbon nanotubes, or mixtures thereof. In certain embodiments, the thermally conductive filler comprises chopped carbon fibers.

The tensile strength filler can comprise, for example, a macro-size filler and/or a nano-size filler. For example, the macro-size tensile strength filler can comprise carbon fibers. The nano-size tensile strength filler can comprise nano-diamonds, carbon nanotubes, or mixtures thereof. The tensile strength of the filler can be from about 30 MPa to about 100 MPa.

A mixture of nano- and micro-fillers can significantly increase the impact strength of the composite. The nano-size impact strength filler can comprise, for example, carbon nanotubes, clays (including exfoliated clays), other high-aspect ratio fibers, rods, and flakes, spherical nano-particles (including, for example, nano-diamonds, fumed silica, nano-alumina, and fumed alumina), or mixtures thereof. The micro-size impact strength filler can comprise, for example, carbon fiber (for example, chopped carbon fiber, amorphous carbon fiber, long carbon fiber, and the like), alumina, or mixtures thereof. In various embodiments, the impact strength filler comprises chopped carbon fiber, spherical nano-particles, or mixtures thereof.

It may also be desirable to incorporate an electrically conductive filler into the polymer matrix. Electrically conductive fillers include, but are not limited to, carbon fibers, carbon nanotubes, and mixtures thereof. Additional additives can be included to provide modified characteristics, such as UV stability, fire retardancy, heat stabilizers, anti-oxidants, dyes, pigments, mold release agents, lubricants, adhesion promoters, and the like.

Referring to FIGS. 4-6, 8, and 9, electrical boards 30 are disposed within the housing 12 and mount at least some of the electrical components of the luminaire 10. In the illustrated embodiment, there are two electrical boards 30 mounted within the housing 12. However, any number of electrical boards 30 could be used without departing from the scope of the disclosure. Further, each electrical board 30 comprises a continuous electrical board extending along a substantial portion of the length L (FIG. 3) of the housing 12. However, one or more electrical boards 30 could comprise separate board segments without departing from the scope of the disclosure. Light sources (e.g., LEDs) 32 are mounted on and electrically connected to the electrical boards 30 for emitting light from the luminaire 10. However, as is understood by those in the art, heat is also produced by the light sources 32 and other electrical components on the electrical boards 30. To facilitate release of the heat generated by the electrical components, the electrical boards 30 are mounted flush against interior side surfaces 34 of the housing 12 at a location where at least a portion of the boards oppose first reduced housing thicknesses $T_1$ to minimize the thermal path for heat to exit the interior of the housing. In the illustrated embodiment, segments of the electrical boards 30 are disposed opposite portions of the outer surface of the housing 12 between the fins 14. In one embodiment, the first reduced housing thickness $T_1$ has a maximum thickness of about 0.25 in. (6.35 mm). In one embodiment, the first reduced housing thickness $T_1$ has a thickness of between about 0.13 in. (3.3 mm) and about 0.25 in. (6.35 mm). In one embodiment, the first reduced housing thickness $T_1$ is about 0.22 in (5.59 mm).

Referring to FIGS. 5, 6, 8, and 10, a driver 40 is also disposed within the housing 12. The driver 40 is electrically connected to the electrical boards 30 and configured to provide electricity to the LEDs 32. The driver 40 is mounted against a top inner surface 42 of the housing 12. Fasteners 44 secure the driver 40 to the top inner surface 42 of the housing 12. The driver 40 is mounted at a location where at least a portion of the driver opposes a second reduced housing thickness $T_2$ to minimize the thermal path for heat to exit the interior of the housing 12. Thus, the driver 40 is positioned within the housing 12 to maximize thermal energy release from the housing. In one embodiment, the second reduced housing thickness $T_2$ has a maximum thickness of about 0.27 in. (6.86 mm). In one embodiment, the second reduced housing thickness $T_2$ has a thickness of between about 0.23 in. (5.84 mm) and about 0.27 in. (6.86 mm). In one embodiment, the second reduced housing thickness $T_2$ is about 0.23 in. (5.84 mm).

The arrangement of the components within the housing 12 also facilitates reducing the overall size of the housing providing a compact luminaire 10 that maintains satisfactory thermal efficiency for use in hazardous environments. In particular, the electrical boards 30 are canted or angled such that they are not oriented horizontally when the housing 12 is oriented horizontally. Rather, the electrical boards 30 are angled inward such that the LEDs 32 on the boards generally emit light downward and toward a central vertical plane P of the housing 12. In the illustrated embodiment, the electrical boards 30 are oriented such that an outer surface of the electrical boards defines a plane that extends at an angle of about 45 degrees to horizontal. In one embodiment, the electrical boards 30 are oriented such that the outer surface extends at an angle of between about 30 degrees and about 60 degrees to horizontal. Still other angle orientations of the electrical boards are envisioned.

By positioning the electrical boards 30 in this manner, a width W (FIG. 5) of the housing 12 can be reduced because the width of the housing does not have to accommodate for the total width of the electrical boards. Mounting the driver 40 above and generally between the electrical boards 30 also allows for the width W of the housing 12 to remain relatively small. A height H of the housing 12 is also reduced by the orientation of the components in the housing. In one embodiment, the length L of the housing 12 has a maximum length of about 40 in. (101.6 cm). In one embodiment, the length L of the housing 12 is about 25.3 in. (64.3 cm). In one embodiment, the width W of housing 12 has a maximum width of about 10 in. (25.4 cm). In one embodiment, the width W of the housing 12 is about 4.7 in. (11.9 cm). In one embodiment, the height H of the housing 12 has a maximum height of about 5 in. (12.7 cm). In one embodiment, the height H of the housing 12 is about 2.7 in. (6.8 cm). At the disclosed dimensions, the luminaire 10 has an ambient temperature rating of at least about 55° C.

Referring to FIGS. 4-6 and 10-12, clips 50A, 50B mount the electrical boards 30 to the housing 12. The clips 50A, 50B can be secured to the housing 12 by inserting fasteners 52 through the clips and into the housing 12. For instance, when the housing 12 is oriented horizontally, the fasteners 52 may extend vertically through the clips 50A, 50B and into the housing to secure the clips to the housing. This is facilitated by the clips 50A, 50B having angled surfaces for engaging the electrical boards 30 and horizontal surfaces for receiving and locating the fasteners 52 on the clips. A first plurality of clips 50A engage the electrical boards 30 generally at a bottom of the boards. The first plurality of clips 50A have a first arm 54 configured to engage a bottom edge of the electrical board 30 and a second arm 56 extending transversely from the first arm and configured to engage an outer surface of the electrical board. More particularly, the outer surface of the electrical board 30 comprises the LED mounting surface of the board. A first engagement surface 57 on the first arm 54 engages the bottom edge of the electrical board 30, and a second engagement surface 59 on the second arm 56 engages the LED mounting surface of the electrical board. A pair of tabs 58 project from the first arm 54 and are received within a notch 60 in the housing 12 to locate the clip 50A on the housing. A notch 61 formed between the tabs 58 receives the fastener 52 for securing the clip 50A to the housing 12. A fastener engaging surface 63 is defined by a bottom surface of the first arm 54 and the tabs 58. When the tabs 58 are received in the notch 60 in the housing 12, the fastener engaging surface 63 is disposed generally horizontally while the second engagement surface 59 on the second arm 56 extends at angle to match the angle of the LED mounting surface of the electrical board 30. Thus, the horizontal fastener engaging surface 63 allows the fastener 52 to be inserted vertically into the clip 50A and engage an orthogonal surface to securely fasten the clip to the housing 12.

Referring to FIGS. 4-6, 10, 13, and 14, a second plurality of clips 50B engage the electrical boards 30 generally at a top of the boards. The second plurality of clips 50B receive and locate fasteners 52 for securing the electrical boards 30 to the interior side surfaces 34 of the housing 12. The second plurality of clips 50B have a board-engaging surface 62 for engaging the LED mounting surface of the electrical boards 30, a fastener engaging surface 65 for engaging the fastener 52, and a housing engaging surface 66 for engaging an inner surface of the housing 112. A notch 64 is formed in each clip 50B. The notch 64 receives a fastener 52 for securing the clip 50B to the housing 12. When the board engaging surface 62 of the clip 50B is engaged with the LED mounting surface of the electrical board 30 such that the board engaging surface extends at an angle to match the LED mounting surface, the fastener engaging surface 65 extends generally horizontally. Thus, the horizontal fastener engaging surface 65 allows the fastener 52 to be inserted vertically into the clip 50B and engage an orthogonal surface to securely fasten the clip to the housing 12. By firmly securing the electrical boards 30 to the housing 12, the first and second plurality of clips 50A, 50B also reduce vibration of the electrical boards. In the illustrated embodiment, there are a pair of first clips 50A and a pair of second clips 50B. However, any number of clips may be used without departing from the scope of the disclosure. Additionally, the electrical boards 30 can be mounted in the housing 12 by other means without departing from the scope of the disclosure.

Figure 4:
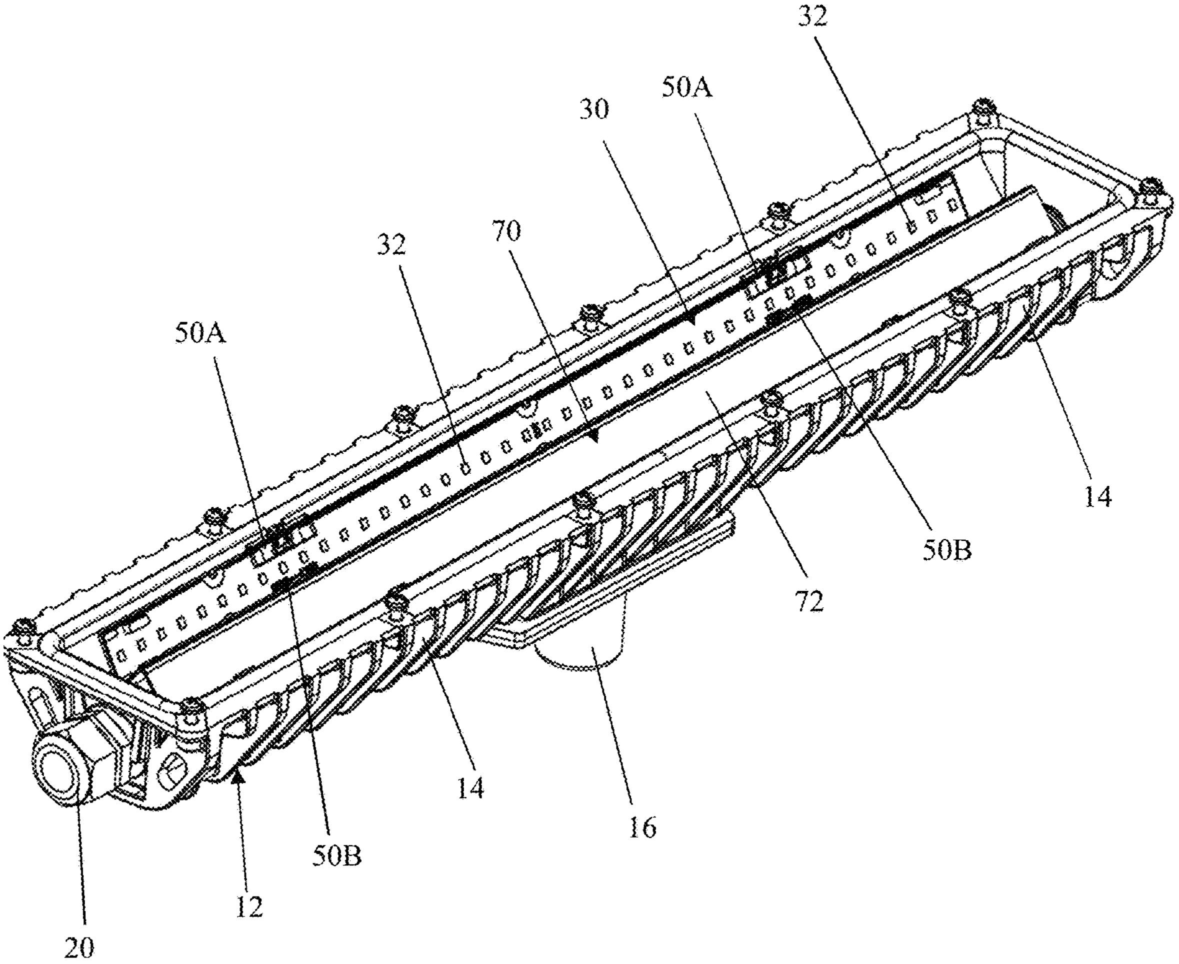
FIG. 4 is a bottom perspective of the luminaire with a cover removed.
Figure 5:
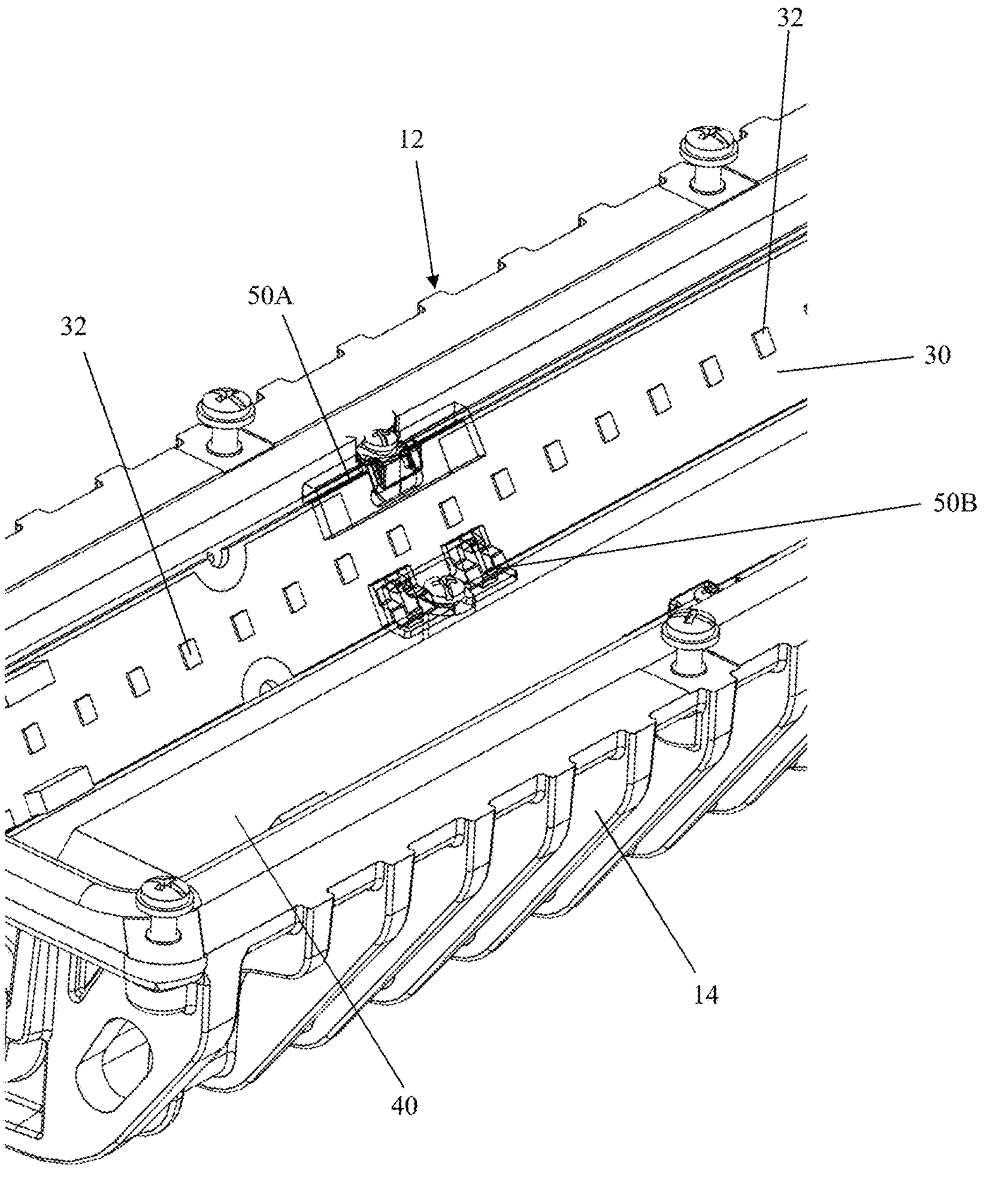
FIG. 5 is an enlarged fragmentary view of FIG. 4.

Referring to FIGS. 4 and 6, a reflector 70 is mounted to the housing 12 for directing the light emitted from the LEDs 32 on the angled electrical boards 30 in a more vertical direction. The reflector 70 is generally disposed between the electrical boards 30 such that light emitted from the LEDs 32 on the electrical boards will impinge upon the reflector. The reflector 70 has angled surfaces 72 which receive the light emitted from the LEDs 32 to redirect at least some of the light downward. Thus, the reflector 70 configures the luminaire 10 to emit light in a path generally consistent with the electrical boards 30 being mounted in a horizontal fashion. In the illustrated embodiment, the angled surfaces 72 of the reflector 70 extend at an angle of about 45 degrees to horizontal when the longitudinal axis LA of the housing 12 is oriented horizontally. In one embodiment, the angled surfaces 72 extend at an angle between about 40 degrees and about 60 degrees to horizontal. The angled surfaces 72 could extend at different angles without departing from the scope of the disclosure.

The reflector 70 is mounted in the housing 12 using the second plurality of clips 50B. Therefore, a separate tool (e.g., mechanical driver) is not required to secure the reflector 70 in the housing 12. The second plurality of clips 50B define a pair of slots 74 that receive mounting arms 76 that extend from respective angled surfaces 72 of the reflector 70 to hold the reflector in place in the housing 12. In particular, the second plurality of clips 50B prevent the reflector 70 from moving vertically within the housing 12. The second plurality of clips 50B may also be configured to prevent horizontal movement of the reflector 70. For instance, a notch (not shown) could be formed in the second plurality of clips 50B to prevent or limit horizontal movement of the reflector 70 relative to the housing 12.

In various embodiments, the thermally conductive polymer luminaire of the present disclosure meets certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to National Electric Code (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive.

Examples of hazardous locations in which example embodiments can be used include, but are not limited to, an airplane hangar, an airplane, a drilling rig (as for oil, gas, or water), a production rig (as for oil or gas), a refinery, a chemical plant, a power plant, a mining operation, a steel mill, and the like.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the compositions without departing from the scope of the disclosure, it is intended that all matter contained in the above description shall be interpreted as illustrative and not in a limiting sense.

The invention claimed is:

1. A polymer luminaire comprising:

a polymer housing having a longitudinal axis;

an electrical board mounted to an inner surface of the housing, the electrical board having an outer surface defining a plane extending at an angle to horizontal when the longitudinal axis of the housing is oriented parallel to horizontal;

clips securing the electrical board to the housing whereby fasteners attaching the clips to the housing extend vertically through the clips and into the housing to secure the clips to the housing when the longitudinal axis of the housing is oriented parallel to horizontal such that longitudinal axes of the fasteners extend substantially orthogonally to the longitudinal axis of the housing; and a light source mounted to the electrical board and electrically connected to the electrical board for emitting light from the housing.

2. The luminaire of claim 1, wherein the clips include a first plurality of clips engaging a bottom of the electrical board, and a second plurality of clips engaging a top of the electrical board.

3. The luminaire of claim 1, further comprising a reflector mounted to the housing for redirecting the light emitted from the light source.

4. The luminaire of claim 3, wherein the reflector has an angled surface configured to receive the light emitted from the light source to redirect at least some of the light from extending in a direction skewed from vertical to extending in a vertical direction when the longitudinal axis of the housing is oriented parallel to horizontal.

5. The luminaire of claim 4, wherein the angled surface extends at an angle between about 40 degrees and about 60 degrees to horizontal when the housing is oriented horizontally.

6. The luminaire of claim 1, wherein the housing includes a top, a bottom, and sides extending along a length of the housing, a width of the housing extending between the sides, and wherein the width of housing is no more than about 10 in. (25.4 cm).

7. The luminaire of claim 6, wherein a height of the housing extends between the top and bottom of the housing, and wherein the height of the housing is no more than about 5 in. (12.7 cm).

8. A polymer luminaire comprising:

a polymer housing having a longitudinal axis;

an electrical board mounted to an inner surface of the housing, the electrical board having an outer surface defining a plane extending at an angle to horizontal when the longitudinal axis of the housing is oriented parallel to horizontal;

clips securing the electrical board to the housing whereby fasteners attaching the clips to the housing extend vertically through the clips and into the housing to secure the clips to the housing when the longitudinal axis of the housing is oriented parallel to horizontal, wherein the clips directly engage the electrical board; and a light source mounted to the electrical board and electrically connected to the electrical board for emitting light from the housing.

* * * * *